United States Patent [19]
Sau

[11] Patent Number: 6,162,877
[45] Date of Patent: Dec. 19, 2000

[54] HYDROPHOBICALLY MODIFIED COMB COPOLYMERS

[75] Inventor: Arjun C. Sau, Newark, Del.

[73] Assignee: Hercules Incorporated, Wilmington, Del.

[21] Appl. No.: 09/209,373

[22] Filed: Dec. 4, 1998

[51] Int. Cl.[7] .................. C08G 65/329; C08L 71/02; C08F 122/06; C08F 120/66; C08F 283/00

[52] U.S. Cl. ................ 525/403; 525/54.1; 525/326.9; 525/327.4; 525/327.7; 525/328.3; 525/329.4; 525/417; 525/420.5

[58] Field of Search ............... 525/54.1, 326.9, 525/327.4, 327.7, 328.3, 329.7, 403, 417, 420.5

[56] References Cited

U.S. PATENT DOCUMENTS

| | | | |
|---|---|---|---|
| 4,079,028 | 3/1978 | Emmons et al. | 524/507 |
| 4,155,892 | 5/1979 | Emmons et al. | 524/507 |
| 4,228,277 | 10/1980 | Landoll | 536/90 |
| 4,243,802 | 1/1981 | Landoll | 536/91 |
| 4,288,639 | 9/1981 | Camp | 536/625 |
| 4,312,775 | 1/1982 | Panek | 252/316 |
| 4,327,008 | 4/1982 | Schimmel et al. | 524/104 |
| 4,354,956 | 10/1982 | Camp | 252/316 |
| 4,380,610 | 4/1983 | Fenton et al. | 525/400 |
| 4,411,819 | 10/1983 | Panek et al. | 252/315.1 |
| 4,426,485 | 1/1984 | Hoy et al. | 524/591 |
| 4,428,860 | 1/1984 | Panek et al. | 252/315.1 |
| 4,496,708 | 1/1985 | Dehm et al. | 528/76 |
| 4,499,233 | 2/1985 | Tetenbaum et al. | 524/591 |
| 4,812,364 | 3/1989 | Alberts et al. | 428/447 |
| 4,847,332 | 7/1989 | Yu | 525/398 |
| 5,023,309 | 6/1991 | Kruse et al. | 528/49 |
| 5,045,230 | 9/1991 | van De Berg et al. | 252/310 |
| 5,281,654 | 1/1994 | Eisenhart et al. | 524/500 |
| 5,290,418 | 3/1994 | Menchem et al. | 204/299 |
| 5,468,365 | 11/1995 | Menchem et al. | 204/299 |
| 5,496,908 | 3/1996 | Bostrom et al. | 528/74.5 |
| 5,556,460 | 9/1996 | Berke et al. | 106/823 |
| 5,574,127 | 11/1996 | Sau | 528/125 |

FOREIGN PATENT DOCUMENTS

| | | | |
|---|---|---|---|
| 281360 | 9/1988 | European Pat. Off. | C08B 37/14 |
| 0 498 442 A1 | 2/1992 | European Pat. Off. | |
| 498442 | 8/1992 | European Pat. Off. | C09D 7/12 |
| 9208753 | 5/1992 | WIPO | C08G 65/32 |
| WO 92 08753 | 5/1992 | WIPO | |
| WO 97 39090 | 10/1997 | WIPO | |

OTHER PUBLICATIONS

Schaller, E. J. and Sperry, P. R.; "Handbook of Coatings Additives", Ed. L.J. Calbo, vol. 2, p. 105, 1992; Marcel Dekker, Inc., New York.

Shay, G. D. and Rich, A. F.; J. of Coatings Technology, vol. 58, No. 7, p. 43, 1986.

Xu, B. et al, Langmuir, 199713,6896.

*Primary Examiner*—Peter A. Szekely
*Attorney, Agent, or Firm*—David Edwards

[57] ABSTRACT

A comb copolymer comprising a backbone comprising (a) hydrophilic units, (b) residues of dihalogeno compound remaining after the halogen atoms have been removed and (c) moiety containing pendant hydrophobe, such copolymer being particularly well suited as thickener for latex paints.

105 Claims, No Drawings

HYDROPHOBICALLY MODIFIED COMB COPOLYMERS

BACKGROUND OF THE INVENTION

1. Field of the Invention

The present invention relates to hydrophobically modified polymers and more particularly it relates to hydrophobically modified water soluble comb copolymers suitable for thickening water-borne systems.

2. Description of the Prior Art

Water soluble polymers (also commonly referred to as "thickeners" or "rheology modifiers") are widely used in many industrial water-borne systems as additives to modify their flow behavior. One such highly filled aqueous system is the latex paint, which is composed of a dispersion of a polymeric latex, pigment and clays and other additives in water.

Typically, a small amount (0.1–5 wt %) of water soluble polymer is added to latex paints to achieve the following performance characteristics during manufacturing, storage, and applications:

a) Ease of formulation and ability to manufacture at a fast rate,
b) Prevention of settling of the suspended particles (latex, pigment, etc.) during storage,
c) Good film build during applications to achieve efficient hiding without excessive brush or roller drag,
d) Good roller spatter resistance,
e) No excessive sagging after application on a vertical surface, and
e) Good flow and leveling for the formation of a smooth and continuous film with good appearance.

Various water soluble polymers currently being used in latex paints are: i) natural polysaccharides, ii) chemically modified polysaccharides, and iii) synthetic polymers. Examples of polysaccharide based thickeners include xanthan gum, locust bean gum, and cellulosics such as hydroxyethylcellulose, methylcellulose, hydroxypropylmethylcellulose and ethylhydroxyethylcellulose. Synthetic thickeners are polyacrylates, polyalkylene oxides and polyacrylamides which could be homopolymers or copolymers. Their hydrolytic stability and performance properties are, however, pH dependent.

The above mentioned natural and synthetic thickeners provide different degrees of thickening efficiency and application properties. However, they invariably fail to provide key performance properties in gloss paints. These include good film build, flow and leveling, and gloss which are generally offered by solvent based alkyd paints. Another drawback of these thickeners is that they have poor compatibility with the various paint ingredients.

To eliminate some of the performance deficiencies of conventional thickeners, a new class of thickeners, commonly referred to as "associative thickeners", has recently been designed and commercialized (See E. J. Schaller and P. R. Sperry, in "Handbook of Coatings Additives", Ed. L. J. Calbo, Vol. 2, p. 105, 1992; Marcel Dekker, Inc., New York). These thickeners are hydrophobically modified water soluble polymers. They undergo intermolecular association in aqueous solution and thereby exhibit enhanced solution viscosity. They can also adsorb onto the dispersed phase particles of an aqueous dispersion and thereby form a three dimensional network. Since they provide improved paint properties not offered by conventional thickeners, they have gained commercial importance.

Polysaccharide based associative thickeners are made by chemically grafting a small amount of a hydrophobic group ($C_{10}$–$C_{24}$ alkyl) onto the polysaccharide backbone and they are disclosed in U.S. Pat. No. 4,228,277; 4,243,802 and EP 281,360.

Among commercial nonionic synthetic associative thickeners, hydrophobically modified ethylene oxide urethane (HEUR) block copolymers constitute an important class. They are disclosed in U.S. Pat. Nos. 4,079,028, 4,155,892, and 5,281,654. These are low molecular weight polyurethanes made by condensing relatively low molecular weight polyethylene glycol (molecular weight ~10,000) with hydrophobic diisocyanates and end-capping with hydrophobic alcohols or amines. They are characterized by having three or more hydrophobes—two of which are terminal and the remainder are internal. The hydrophobic groups are connected to the hydrophilic polyethylene oxide blocks through urethane linkages.

The preparation of water dispersible HEURs is disclosed in U.S. Pat. Nos. 4,499,233 and 5,023,309. These HEURs are claimed to provide superior viscosifying properties and improved leveling in aqueous systems.

Processes for the production of HEURs with pendant hydrophobes in bunches are described in U.S. Pat. Nos. 4,426,485 and 4,496,708. These HEURs are believed to provide enhanced thickening to aqueous systems through micelle-like association.

HEURs with branched structure and terminal hydrophobes are disclosed in U. S. Pat. No. 4,327,008. They are made by reacting polyalkylene oxides with a polyfunctional material, a diisocyanate and water and end-capping the resulting product with a hydrophobic monofunctional active hydrogen-containing compound or a monoisocyanate.

Silicon-containing HEURs having particular utility in paints and coatings are disclosed in European Patent Application No. 0498,442 A1. These are reaction products of isocyanate functional material, a polyether polyol, a monofunctional active hydrogen containing hydrophobic compound, a silane-functional material, and water.

One of the drawbacks of HEUR thickeners is that they are hydrolytically unstable under strongly acidic or alkaline conditions, particularly at elevated temperatures. Hence, they cannot be processed or used in such situations.

From applications and economic point of view, the major drawbacks of HEUR thickeners are their high cost, difficulty in handling, and tendency to destabilize the paint (separation of dispersed particles from the aqueous phase) (G. D. Shay and A. F. Rich, *J. of Coatings Technology*, Vol. 58, No. 7, p.43, 1986).

Random copolymers of ethylene oxide and long chain alkyl epoxides are disclosed in U. S. Pat. No. 4,304,902. These copolymers provide enhanced aqueous viscosity, but do not provide good flow and leveling in latex paints.

U.S. Pat. No. 4,411,819 describes the preparation of polyethers which have branched chain structure and are characterized by having terminal hydrophobes. They are made by reacting a low molecular weight polyol with a mixture of ethylene oxide and at least one lower alkylene oxide having 3–4 carbon atoms. The polyethers are then end-capped with a mixture of $C_{12}$–$C_{18}$ alpha-olefin oxides.

Low molecular weight (~9,000) hydrophobically end-capped polyether is disclosed in PCT Int. Appl. WO 92 08753. These are made by coupling low molecular weight (~4,500) surfactant with m-dichloromethylbenzene. Preparation of low molecular weight (~9,000) hydrophobe end-capped polyethers is also disclosed in U.S. Pat. No. 5,045, 23. These are made by reacting $C_8$–$C_{22}$ aliphatic alcohols with a mixture of ethylene oxide and propylene oxide and subsequently coupling the alkoxylated alcohols with a diepoxide to form a polyether (MW ~9,000). Since these hydrophobically end-capped polyethers are of low molecular weight, they do not efficiently viscosify aqueous systems including latex paints.

U.S. Pat. No. 5,574,127 discloses associative thickeners which are water soluble polymer compositions that have a backbone of poly(acetal- or ketal-polyether) with ends that are capped with hydrophobic groups. They are prepared by copolymerizing an alpha, omega-diol, -dithiol or -diamino polyether with a gem-dihalide compound in the presence of a base to form an alpha, omega-diol, -dithiol or -diamino poly(acetal- or ketal-polyether) which in turn is reacted with hydrophobic reagents to form the final product. These associative thickeners are used in film forming coating compositions, such as latex paints.

An alternative strategy to achieve better rheological properties for various water-borne systems is to rely on the properties of associative thickeners with a comb architecture. Comb type polyurethane thickeners are described in U. S. Pat. No. 5,496,908. These polymers have moderate viscosities in aqueous solution and are useful as thickeners for alkyd- or latex-based paints. Also reported are synthesis and viscoelastic properties of comb type polyurethane thickeners (Xu, B. et al, Langmuir, 1997, 13, 6896; Xu, B. et al, Langmuir, 1997, 13, 6903).

It is known in the art that currently there is no single thickener that provides all the desired performance characteristics required in water-borne coatings. Hence, very often, attempts are made to use blends of two or more different thickeners to achieve the targeted coating rheology. While this approach works in a limited way, blending of thickeners is often cumbersome and depending on mutual interactions between the individual thickener, the stability and performance of the coatings could be in jeopardy.

Despite the continued activity in the art, there has not been produced a hydrophobically modified synthetic water soluble polymer which is hydrolytically stable over a wide pH range and at elevated temperatures and useful for viscosifying aqueous compositions in a cost-effective manner.

SUMMARY OF THE INVENTION

According to the present invention, there is provided a comb copolymer comprising a backbone comprising (a) hydrophilic units, (b) at least one residue of a dihalogeno compound after the removal of halogen atoms and (c) at least one moiety containing pendant hydrophobe. In addition, the chain ends of such comb copolymers may bear hydrophobes.

Further provided according to the present invention is a process for preparing a comb copolymer comprising a backbone comprising (a) hydrophilic units, (b) at least one residue of a dihalogeno compound after the removal of halogen atoms and (c) at least one moiety containing pendant hydrophobe comprising:

(1) copolymerizing water soluble polymer bearing alpha, omega-active hydrogen,
(2) hydrophobic compounds having alpha, omega-active hydrogen atoms or their alkoxylated derivatives, and
(3) dihalogeno compounds or their derivatives in the presence of a base for a sufficient time to form said comb copolymer.

Provided according to the present invention are film forming coating compositions comprising the comb copolymers of the present invention.

DETAILED DESCRIPTION OF THE INVENTION

A comb copolymer comprising a backbone comprising: (a) hydrophilic units, (b) at least one residue of a dihalogeno compound after the removal of halogen atoms, and (c) at least one moiety containing pendant hydrophobe have been found to efficiently thicken various water-borne systems including latex paints and provide the best combination of paint properties (flow and leveling, film build, spatter resistance, and sag resistance) in an efficient manner. The dihalogeno compound providing residue (b) may or may not contain pendant hydrophobes. Depending on their chemical composition, the comb copolymer can be nonionic, cationic or anionic.

"Flow and leveling" as used in this invention refers to the degree to which a coating flows out after application so as to obliterate any surface irregularities such as, brush marks, an "orange peel" appearance, peaks or craters, which are produced by the mechanical process of applying a coating.

"Film build" means the formation of a continuous film to uniformly cover the surface of the substrate that is being coated.

"Spatter resistance" means the ability of the coating formulation to resist the formation of flying tiny droplets during application of the coating.

"Stability" means the ability to maintain the viscosity upon aging and to prevent phase separation.

"Sag resistance", as used herein, refers to the downward movement resistance of the coating on a vertical surface between the time of application and setting. Sagging leads to uneven coating having a thick bottom edge. The resulting sag is usually restricted to a local area of a vertical surface and may have the characteristics of a draped curtain. Sagging is aesthetically undesirable. In addition, coatings with good sag resistance will not easily drip off a paint brush or paint roller and will not easily drip off a horizontal surface such as for example, a ceiling after it is applied.

The water soluble hydrophilic polymers from which the hydrophilic units can be derived are selected from the group consisting of polyalkylene oxide, copolymer of polyalkylene oxide, poly(acrylic acid), poly(acrylic acid-co-methacrylic acid), poly(acrylamide), poly(dialkyidiallylammonium salts), polyamidopolyamine, poly(ethyleneimine), poly (methyl vinyl ether-co-maleic anhydride), polyvinylpyrrolidone, poly(2-ethyloxazoline) and polypeptides.

The polyalkylene oxide units are derived from compounds selected from the group consisting of water soluble polyalkylene oxides and copolymers thereof and preferably they are derived from polyethylene oxide and water soluble copolymers of polyethylene oxide.

The polyalkylene oxides and copolymers of polyalkylene oxides generally have a weight average molecular weight (Mw) of at least about 200, preferably at least about 8,000. The polyalkylene oxides and copolymers of polyalkylene oxides generally have a Mw of up to about 35,000, preferably up to about 10,000.

The residue of dihalogeno species can be any hydrocarbyl radical, preferably hydrocarbyl radical having from 1 to 20 carbon atoms.

The residues of dihalogeno species can be derived from dihalogeno compounds and their derivatives. Generally, the dihalogeno compounds can be dihalogenoalkanes, dihalogeno substituted aromatic compounds, dihalogenoorganometallic compounds and derivatives thereof. Preferably the dihalogeno compounds are gem-dihalogeno methane and its derivatives, dihalogenoxylenes, and their derivatives, dihalogenoorganosilanes and dihalogenoorganophosphorous compounds and their derivatives. Most preferably the dihalogeno compounds are dibromo- and dichloro-methane and their derivatives, α,α'-dichloro- and dibromoxylene and their derivatives and gem-dichloro and dibromoogranosilanes and organophosphorous compounds and their derivatives.

The residue of dihalogeno compound can be an alkylene radical, such as methylene, ethylene, etc. radical, a xylenylene radical, or an organometallic radical, such as organosilyl radical and/or organophosphoryl radical.

In the context of the present application, the term "derivatives" as it refers to dihalogeno compounds and their derivatives means that such compounds are substituted with alkyl, aryl, and/or aralkyl groups.

The moiety containing pendant hydrophobes groups is derived from hydrophobic compounds having alpha, omega-active hydrogen atoms and their alkoxylated derivatives, preferably from alkylene oxide modified fatty amines, and ethoxylated organosilicon or organophosphorous compounds having hydrophobes attached thereto and from fullerene compounds (carbon cage compounds containing 60–90 carbon atoms) and most preferably from ethoxylated fatty amine. The hydrophobe can be hydrocarbyl, alkyl, alkenyl, aryl, arylalkyl, arylalkenyl, cycloaliphatic, perfluoroalkyl, carbosilyl, fullerenyl, polycyclic and complex dendritic groups, preferably it is alkyl group. Generally the hydrophobe has at least one carbon atom, preferably at least six carbon atoms. Generally the hydrophobe has up to ninety carbon atoms, preferably up to twenty-two carbon atoms.

Generally, the hydrophobes in the hydrophobic compounds have a molecular weight of at least about 15, preferably at least about 115. Generally, the hydrophobes have a molecular weight of up to about 1,100 preferably up to about 250.

The geometry of the comb copolymer backbone can be linear, branched or star type, preferably linear. Generally, the comb copolymer has a weight average molecular weight of at least about 6,000, preferably at least about 15,000. Generally, the comb copolymer has a weight average molecular weight of up to about 150,000, preferably up to about 100,000.

In addition to the pendant hydrophobes, the comb copolymers of the present invention may optionally have hydrophobes at the chain ends of the comb copolymers as well.

The comb type hydrophobically modified copolymers of the present invention are made by copolymerizing:
(1) water soluble (hydrophilic) polymer bearing alpha, omega-active hydrogen atoms such as polyalkylene oxide, copolymer of polyalkylene oxide, poly(acrylic acid), poly(acrylic acid-co-methacrylic acid), poly(acrylamide), poly(dialkyldiallylammonium salts), polyamidopolyamide, poly(ethyleneimine), poly(methyl vinyl ether-co-maleic anhydride), polyvinylpyrrolidone, poly(2-ethyloxazoline) and polypeptides.
(2) hydrophobic compounds having alpha, omega-active hydrogen atoms or their alkoxylated derivatives, such as alkylene oxide modified fatty amines, and ethoxylated organosilicon or organophosphorous compounds having hydrophobes compounds groups attached thereto, and
(3) dihalogeno compounds or their derivatives
in the presence of a base for a sufficient time to form said comb copolymer.

In the context of the present application the term "hydrophobic compounds having alpha, omega- active hydrogen atoms" means hydrophobic compounds bearing more than one active hydrogen and the term "their alkoxylated derivatives" means such compounds modified with alkylene oxide.

The comb type copolymer thus formed in turn can be reacted with a hydrophobic compound capable of reacting with active hydrogen atoms to form a hydrophobically end capped comb copolymer. The hydrophobe can be hydrocarbyl, alkyl, alkenyl, aryl, arylalkyl, arylalkenyl, cycloaliphatic, perfluoroalkyl, carbosilyl, fullerenyl, polycyclic and complex dendritic groups, preferably it is alkyl group.

The process can be carried out in any solvent or solvent mixtures devoid of active hydrogens and stable to bases. However, preferred solvents are oxygenated solvents, such as tetrahydrofuran and alkyl ethers of alkylene glycols or hydrocarbon solvents. For running the process in a solvent, the base can be any strong base, preferably the base is sodium hydride.

In addition, the process can also be carried out in the absence of a solvent. In this case, the preferred base is an alkali metal hydroxide and the most preferred is sodium hydroxide.

The reaction scheme to form the comb copolymers of the present invention can be illustrated by the following:

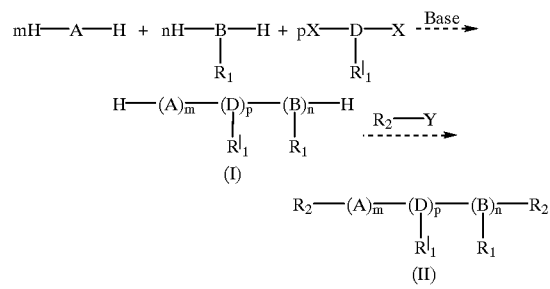

I=Comb copolymer with pendant hydrophobes

II=Comb copolymer with pendant and terminal hydrophobes where H—A—H=a hydrophilic polymer bearing alpha, omega-active hydrogen atoms, H—B($R_1$)—H=a compound comprising a chemical entity "B", which can be an atom or a group of atoms, having a valence of at least three and having attached to "B" alpha, omega-active hydrogen atoms and a pendant hydrophobe group "$R_1$" or a mixture thereof;

$R_1$=hydrocarbyl, alkyl, alkenyl, aryl, arylalkyl, arylalkenyl, cycloaliphatic, perfluoroalkyl, carbosilyl, fullerenyl, polycyclic and complex dendritic groups;

X—D($R^l_1$)—X=a dihalogeno compound wherein D is a hydrocarbon moiety, preferably having from 1 to 20 carbon atoms, or organometallic radical, such as organosilyl radical or organophosphoryl radical or a mixture thereof;

$R^l_1$=H or a hydrophobe radical or organometallic radical;

X=halogen, such as Br, Cl, etc.;

$R_2$—Y=hydrophobic compound capable of reacting with terminal active hydrogens of comb copolymer (I) through its functional group Y;

$R_2$=hydrocarbyl, alkyl, alkenyl, aryl, arylalkyl, arylalkenyl, cycloaliphatic, perfluoroalkyl, carbosilyl, fullerenyl, polycyclic and complex dendritic groups;

m, n and p represent the number of units of —A—, —B($R_1$)— and —D($R^l_1$)— in comb copolymer (I) and comb copolymer (II), preferably m=1–50; n=1–20; p=1–10.

Note that if X—D($R^l_1$)—X is a geminal dihalogeno compound, then A and B blocks in comb copolymer (I) and comb copolymer (II) are connected through acetal or ketal linkages which are stable in alkaline environments.

The active hydrogens in H—A—H and H—B(R$_1$)—H can be part of functional groups such as —OH, —SH and —NH$_2$.

As far as the type of hydrophobes are concerned, the pendant and terminal hydrophobes could be the same or different. Similarly, the terminal hydrophobes could be the same or different.

As one skilled in the art would appreciate, a wide variety of comb type hydrophobically modified polyacetal- or polyketal-polyethers could be made by appropriately selecting various reaction conditions and manipulating the stoichiometry and structure of the reactants H—A—H, H—B(R$_1$)—H, X—D(R$^l_1$)—X and R$_2$—Y.

The preferred procedure of making comb copolymers of the present invention comprises suspending or dissolving H—A—H and H—B (R$_1$)—H in an inert solvent and copolymerizing them with X—D(R$^l_1$)—X in the presence of a suitable base or catalyst at elevated temperatures. The end-capped hydrophobically modified comb copolymer can be made in turn by reacting this comb copolymer with a hydrophobic reagent. Suitable solvents include toluene, xylene, aliphatic hydrocarbon solvents, tetrahydrofuran, dialkyl ethers of alkylene glycol, diethoxymethane and the like. Suitable bases include finely divided sodium hydride, alkali metal hydroxides, and alkali metal carbonates. Organic bases also could be used. It is critical that the reaction solvent and reactants used in the process should be anhydrous or substantially free of moisture.

The scope of this invention as claimed is not intended to be limited by the following examples, which are given merely by way of illustration. All parts are by weight unless otherwise indicated.

The hydrophobically modified comb copolymers of the present invention are suitable for use as rheology modifiers in paints, paper coatings, personal care products, textiles, adhesives, inks, oil well drillings, etc.

Procedure for determining the weight average molecular weight of hydrophobically modified comb copolymers The weight average molecular weight of various hydrophobically modified comb copolymers was measured by size exclusion chromatography (SEC). The SEC measurements were performed in a 0.20M lithium acetate buffer (pH 4.8) plus 1.0% randomly substituted methylated beta-cyclodextrin plus 0.1% N-methyl pyrrolidone (NMP) mobile phase with both the columns and the refractive index detector thermostated at 40° C. The polymers were chromatographed through a set of four SHODEX PROTEIN® Columns (KW804+KW804+KW803+KW803) at a flow rate of 1.0 ml/min. A sample concentration of 0.15% was used with an injection volume of 200 microliter. The molecular weight distribution data are based on polethylene oxide/polyethylene glycol standards with narrow molecular weight distributions and are not absolute.

EXAMPLE 1

Preparation of C$_{16}$ end-capped comb copolymer containing C$_{16}$/C$_{18}$ pendant hydrophobes To a stainless steel pressure reactor (Chemco type) were added polyethylene glycol (MW ~8,000) (PEG-8000) (563 g) (as is, i.e. containing about 2% of moisture), RHODAMEEN® T-50 (ethoxylated tertiary amine based on the tallow (C$_{16}$/C$_{18}$) radical and 50 moles of ethylene oxide) (available from Rhodia, Inc.) (58 g), tetrahydrfuran (THF) (750 ml) and sodium hydride (60% dispersion in mineral oil) (22 g). After sealing the reactor, the contents of the reactor were heated at 80° C. for 1 hour and then cooled to 40° C. Following this, dibromomethane (12 g) was added to the reaction mixture at 40° C. and the resulting reaction mixture heated at 80° C. for 4 hours.

To this reaction mixture at 80° C. was added cetyl bromide (65 g) and the resulting reaction mixture heated at 120° C. for 2 hours. After that, the reaction mixture was cooled to room temperature and the reactor charge transferred into a polypropylene tray. After evaporation of solvent, a fluffy solid was obtained.

The C$_{16}$ end-capped comb copolymer thus formed had a weight average molecular weight of 42,923 and the polydispersity index was 2.22. It was soluble in water (2% solution Brookfield viscosity at 30 rpm at 22° C. ~510 cps). The cetyl and stearyl content of the copolymer were 1.67 and 0.05 wt. % respectively.

EXAMPLE 2

Preparation of C$_{16}$ end-capped comb copolymer containing C$_{16}$/C$_{18}$ pendant hydrophobes Example 1 was repeated using the following:
a) PEG-8000—560 g
b) RHODAMEEN T-50—44 g
c) THF—750 ml
d) Sodium hydride (60% dispersion in mineral oil)—22 g
e) Dibromomethane—12 g
f) Cetyl bromide—65 g The C$_{16}$ end-capped comb copolymer thus formed had a weight average molecular weight of 52,154 and the polydispersity index was 2.26. The cetyl content of the copolymer was 1.3 wt %. It was soluble in water (2% solution Brookfield viscosity at 30 rpm at 22° C. ~335 cps).

EXAMPLE 3

Preparation of C$_{16}$ end-capped comb copolymer containing C$_{16}$/C$_{18}$ pendant hydrophobes Example 1 was repeated using the following:
a) PEG-8000—376 g
b) RHODAMEEN T-50—116 g
c) THF—750 ml
d) Sodium hydride (60% dispersion in mineral oil)—22 g
e) Dibromomethane—12 g
f) Cetyl bromide—65 g The C$_{16}$ end-capped comb copolymer thus formed had a weight average m.wt. of 48,919 and the polydispersity index was 2.14. It was swellable as judged by the phase separation of the swollen polymer when the polymer was suspended in water, stirred for 2 hours and allowed to stand overnight.

EXAMPLE 4

Preparation of C$_{16}$ end-capped comb copolymer containing C$_{16}$/C$_{18}$ pendant hydrophobes Example 1 was repeated using the following:
a) PEG-8000—654 g
b) RHODAMEEN T-50—29 g
c) THF—750 ml
d) Sodium hydride (60% dispersion in mineral oil)—22 g
e) Dibromomethane—12 g
f) Cetyl bromide—65 g The C$_{16}$ end-capped comb copolymer thus formed had a weight average molecular weight of 45,722 and the polydispersity index was 1.94. The cetyl content of the copolymer was 1.16 wt %. It was soluble in water (2% solution Brookfield viscosity at 30 rpm at 22° C. ~130 cps).

EXAMPLE 5

Preparation of $C_{16}$ end-capped comb copolymer containing $C_{16}/C_{18}$ pendant hydrophobes with 50 moles of ethylene oxide To an Abbe ribbon blender were added PEG-8000 (1000 g), RHODAMEEN T-50 (46 g) and sodium hydroxide ( 34 g). After sealing the reactor, the mixture was heated at 80° C. for one hour. Then dibromomethane (20 g) was added to the PEG-8000/NaOH mixture and the resulting reaction mixture heated at 80° C. for 4 hours to form the PEG-8000/RHODAMEEN T-50/methylene terpolymer.

To this terpolymer at 80° C. was added cetyl bromide ( 70 g) and the resulting reaction mixture heated at 120° C. for 2 hours. Following this, the reactor was opened and the molten reaction mixture poured into a plastic tray. Upon cooling to room temperature, the reaction mixture solidified.

The $C_{16}$ end-capped comb copolymer thus formed had a weight average molecular weight of 33,069 and the polydispersity index was 1.82. It was soluble in water (2% solution Brookfield viscosity at 30 rpm at 22° C. ~580 cps). The cetyl content of the copolymer was 2.2 wt %.

Paint Properties of Hydrophobe End-Capped Comb Copolymers

UCAR 367 Vinyl/Acrylic Flat Paint Properties of Hydrophobe End-Capped Comb CoPolymers The comb copolymers of the present invention were incorporated into a vinyl/acrylic latex (UCAR 367) based flat paint (pigment volume concentration=60%) and an all-acrylic (Rhoplex AC-417M) semigloss paint to achieve an initial Stormer viscosity of 90–95 Kreb Units. The significance and scale of various paint properties are as follows.

a) Stormer viscosity (initial and after overnight storage) is measured by a Stormer viscometer at 200 $sec^{-1}$ shear rate and expressed in Kreb Units (KU).

b) ICI viscosity is measured by an ICI plate and cone viscometer at 10,000 $sec^{-1}$ and expressed in poise.

c) Thickening efficiency (TE) measured as wt % thickener needed in the paint to achieve the initial Stormer viscosity.

d) Leveling by Leneta method (measured on a scale of 0–10; 0=worst and 10=best).

e) Sag resistance by Leneta method, mid-range bar, wet film thickness (WFT, in mils) above which sag occurs.

f) Spatter resistance by roll-out over a black panel (compared on a scale of 0–10; 0=worst and 10=best).

g) 60° Gloss is specular reflectance gloss viewed at 60° C.

The paint properties of various hydrophobe end-capped comb copolymers are shown in Tables 1 and 2.

TABLE 1

Rhoplex AC-417M Acrylic Semigloss Paint Properties of $C_{16}$ End-Capped Comb Copolymers

| Comb CoPolymer of Example | PEG-8000 (g) | RT-50[2] (g) | 2% BF[3] (cps) | TE(%) | Stormer Viscosity (KU) | ICI (poise) | Level | Sag | Spatter | 60° Gloss |
|---|---|---|---|---|---|---|---|---|---|---|
| Ex. 3 | 376 | 116 | Swellable | 0.26 | 88/99 | 0.7 | 2 | 18 | 8 | 45.4 |
| Ex. 1 | 563 | 58 | 510 | 0.25 | 92/102 | 0.8 | 4 | 11 | 7 | 49.2 |
| Ex. 2 | 560 | 44 | 335 | 0.33 | 92/106 | 1.1 | 6 | 10 | 9 | 49.0 |
| Ex. 4 | 654 | 29 | 130 | 0.55 | 88/101 | 1.6 | 10 | 6 | 9 | 49.0 |
| Ex. C-1 | | — | 410 | 0.36 | 90/106 | 1.6 | 9 | 8 | 9 | 47.3 |
| Ex. 1:Ex. C-1[1] 1:3 blend | | | — | 0.38 | 89/103 | 1.2 | 6 | 9 | 9 | 47.7 |
| Ex. 1:Ex. C-1 1:1 blend | | | — | 0.38 | 91/106 | 1.2 | 7 | 10 | 8 | 47.0 |

[1]Ex. C-1 $C_{16}$ End-capped linear poly(acetal-polyether)) prepared according to Example 28 of U.S. Pat. No. 5,574,127;
[2]RT-50 = Rhodameen ®T-50
[3]BF = Brookfield viscosity measured at 30 rpm

TABLE 2

UCAR 367 Vinyl/Acrylic Flat Paint Properties of $C_{16}$ End-Capped Comb Copolymers

| Comb CoPolymer of Example | PEG-8000 (g) | RT-50 (g) | 2% BF (cps) | TE(%) | Stormer Viscosity (KU) | ICI (poise) | Level | Sag | Spatter | 60° Gloss |
|---|---|---|---|---|---|---|---|---|---|---|
| Ex. 3 | 376 | 116 | Swellable | 0.59 | 94/108 | 0.9 | 9 | 6 | 9 | |
| Ex. 1 | 563 | 58 | 510 | 0.54 | 93/109 | 1.4 | 9 | 6 | 9 | |
| Ex. 2 | 560 | 44 | 335 | 0.58 | 97/113 | 1.9 | 9 | 6 | 9 | |
| Ex. 4 | 654 | 29 | 130 | 0.88 | 94/110 | 2.5 | 9 | 6 | 9 | |
| Ex. C-1 | | — | 410 | 0.63 | 97/109 | 2.2 | 9 | 6 | 9 | |
| Ex. 1:Ex. C-1 1:3 blend | | | — | 0.64 | 96/114 | 2.3 | 9 | 6 | 9 | |
| Ex. 1:Ex. C-1 1:1 blend | | | — | 0.63 | 95/111 | 1.8 | 9 | 6 | 9 | |

EXAMPLE 6

Preparation of $C_{16}$ end-capped comb copolymer containing $C_{16}/C_{18}$ pendant hydrophobes Example 5 was repeated using the following reagents.
a) PEG-8000—1000 g
b) RHODAMEEN T-50—44.5 g
c) Sodium hydroxide—35 g
d) Dibromomethane—19 g
e) Cetyl bromide—100 g The $C_{16}$ end-capped comb copolymer thus formed had a weight average molecular weight of 25,672 (polydispersity index ~1.8). It was soluble in water (2% solution Brookfield viscosity at 30 rpm at 22° C. ~250 cps).

EXAMPLE 7

Preparation of comb copolymer containing $C_{16}/C_{18}$ pendant hydrophobes

Example 5 was repeated using the following reagents except that the terpolymer formed by copolymerizing PEG-8000, RHODAMEEN T-50 and dibromomethane was not reacted with cetyl bromide.
(a) PEG-8000—750 g
(b) RHODAMEEN T-50—154 g
(c) Sodium hydroxide—35 g
(d) Dibromomethane—20 g The comb copolymer thus formed had a weight average molecular weight of 31,918 (polydispersity index ~1.79). It was soluble in water (6% solution Brookfield 15 viscosity at 30 rpm at 22° C. ~128 cps).

EXAMPLE 8

Preparation of $C_{16}$ end-capped comb copolymer containing $C_{16}/C_{18}$ pendant hydrophobes Example 5 was repeated using the following reagents and the terpolymer formed by copolymerizing PEG-8000, RHODAMEEN T-50 and dibromomethane was end capped with cetyl bromide.
a) PEG-8000—750 g
b) RHODAMEEN T-50—154 g
c) Sodium hydroxide—35 g
d) Dibromomethane—20 g
e) Cetyl bromide—55 g The $C_{16}$ end-capped comb copolymer thus formed was soluble in water (2% solution Brookfield viscosity at 30 rpm at 22° C. ~760 cps).

EXAMPLE 9

Preparation of comb copolvmer containing $C_{16}/C_{18}$ pendant hydrophobes

Example 7 was repeated using the following reagents.
(a) PEG-8000—751 g
(b) RHODAMEEN T-50—232 g
(c) Sodium hydroxide—35 g
(d) Dibromomethane—22 g The comb copolymer thus formed had a weight average molecular weight of 24,481 (polydispersity index ~1.93. It was soluble in water (6% solution Brookfield viscosity at 30 rpm at 22° C. ~128 cps).

EXAMPLE 10

Preparation of $C_{16}$ end-capped PEG-8000/bisphenol-A/methylene terpolymer

Example 7 was repeated using the following reagents.
a) PEG-8000—1000 g
b) Bisphenol-A polyethoxylate (O:MACOL RD 230E) (available from PPG Industries)—27 g
c) Sodium hydroxide—35 g
d) Dibromomethane—22 g
e) Cetyl bromide—100 g The terpolymer thus formed was soluble in water (2% solution Brookfield viscosity at 30 rpm at 22° C. ~588 cps).

EXAMPLE 11

Preparation of $C_{16}$ end-capped comb copolymer using Rhodameen® T-12/90

Example 5 was repeated using Rhodameen® T-12/90 in place of Rhodameen® T-50. Note: Rhodameen®D T-12/90, available from Rhodia, Inc., is an ethoxylated tertiary amine based on the tallow radical (mixture of $C_{16}$ and $C_{18}$ hydrophobes) and 20 moles of ethylene oxide.

The various reagents used to make the comb copolymer are given below.
(a) PEG-8000—1000 g
(b) Rhodameen® T-12/90—40 g
(c) Sodium hydroxide—34 g
(d) Dibromomethane—20 g
(e) Cetyl bromide—70 g The $C_{16}$ end-capped comb copolymer thus obtained had a weight average molecular weight of 19,000 and the polydispersity index was 1.49. It was soluble in water (2% solution Brookfield viscosity at 30 rpm ~50 cps). The cetyl and octadecyl content of the copolymer were 2.3 and 0.03 wt % respectively.

EXAMPLE 12

Preparation of $C_{16}$ end-capped comb copolymer using 3-octadecyloxy-1,2-propanediol Example 5 was repeated using 3-octadecyloxy-1,2-propanediol in place of Rhodameen® T-50.
1. PEG-8000—1000 g
2. DL-3-Octadecyloxy-1,2-propanediol—11 g
3. Sodium hydroxide—34 g
4. Dibromomethane—20 g
5. Cetyl bromide—70 g The $C_{16}$ end-capped comb copolymer thus obtained had a weight average molecular weight of 58,969 and the polydispersity index was 1.99. It was soluble in water (2% solution Brookfield viscosity at 30 rpm ~540 cps). The cetyl and octadecyl content of the copolymer were 1.26 and 0.14 wt % respectively.

EXAMPLE 13

Preparation of polyacetal Polvether comb copolymer bearing $C_{18}$ hydrophobes

Example 12 was repeated using cetyl bromide as the end-capping reagent.
1. PEG-8000—820 g
2. DL-3-Octadecyloxy-1,2-propanediol—8.2 g
3. Sodium hydroxide—27 g
4. Dibromomethane—16.4 g The comb copolymer bearing $C_{18}$ pendant hydrophobes had a weight average molecular weight of 47,381 and the polydispersity index was 1.72. It was soluble in water (7.3% solution Brookfield viscosity at 30 rpm ~25 cps). The cetyl content of the copolymer was 0.17 and 0.21 wt % respectively.

EXAMPLE 14

Preparation of $C_{16}$ end-capped comb polymer using 1-phenyl-1 2-ethane diol

Example 12 was repeated using 1-phenyl-1,2-ethane diol in place of 3-octadecyloxy-1,2-propanediol.
1. PEG-8000—1000 g
2. 1-Phenyl-1,2-ethane diol—4.7 g
3. Sodium hydroxide—34 g 4. Dibromomethane—20 g
5. Cetyl bromide—70 g The $C_{16}$ end-capped comb polymer thus obtained had a weight average molecular weight of 34,772 and the polydispersity index was 1.57. It was soluble in water (2% solution Brookfield viscosity at 30 rpm ~470 cps). The cetyl content of the copolymer was 1.95 wt %.

EXAMPLE 15

Preparation of $C_{16}$ end-capped comb copolymer bearing pendant perfluoro alkyl hydrophobes Example 1 was repeated using 1H, 1H, 2H, 3H, 3H-pentafluoroundecane-1,2-diol in place of Rhodameen® T-50. The ingredients used were as follows.
1. PEG -8000—100 g
2. 1H, 1H, 2H, 3H,3H-pentafluoroundecane-1,2-diol—1.67 g
3. Sodium hydride (60% dispersion in mineral oil)—4 g
4. Tetrahydrofuran—750 ml
5. Dibromomethane—2.4 g
6. Cetyl bromide—11.5 g The $C_{16}$ end-capped comb copolymer thus obtained had a weight average molecular weight of 60,762 and the polydispersity index was 3.6. It was soluble in water (2% solution Brookfield viscosity at 30 rpm ~470 cps). The cetyl content of the copolymer was 0.5 wt %.

EXAMPLE 16

Preparation of $C_{16}$ end-capped comb copolymer using 1,3-dioxane-5,5-dimethanol Example 5 was repeated using 1,3-dioxane-5,5-dimethanol in place of Rhodameen® T-50.
1. PEG-8000—1000 g
2. 1,3-Dioxane-5,5-dimethanol—4.7 g
3. Sodium hydroxide—34 g
4. Dibromomethane—20 g
5. Cetyl bromide—70 g The $C_{16}$ end-capped comb copolymer thus obtained had a weight average molecular weight of 34,870 and the polydispersity index was 1.95. It was soluble in water (2.3% solution Brookfield viscosity at 30 rpm ~475 cps). The cetyl content of the copolymer was 1.95 wt %.

EXAMPLE 17

Preparation of $C_{16}$ end-capped comb copolymer bearing pendant fluorobenzal hydrophobes Example 1 was repeated using 3-fluorobenzal bromide in place of dibromomethane. The ingredients used were as follows.
1. PEG -8000—100 g
2. Tetrahydrofuran—750 ml
3. 3-Fluorobenzal bromide (available from Lancaster Synthesis Inc.)—3.8 g
4. Sodium hydride (60% dispersion in mineral oil)—4 g
5. Cetyl bromide—6 g The $C_{16}$ end-capped comb copolymer thus obtained had a weight average molecular weight of 11,079 and the polydispersity index was 1.09. It was swellable in water. The cetyl content of the copolymer was 0.9 wt %.

EXAMPLE 18

Preparation of $C_{16}$ end-capped comb copolymer using a mixture of polyethylene glycols with different molecular weight and Rhodameen T-50

Example 5 was repeated using a mixture of polyethylene glycols and Rhodameen T-50.
1. Polyethylene glycol (MW ~8000)—980 g
2. Polyethylene glycol (MW ~2000)—30 g
3. Rhodameen T-50—46 g
4. Sodium hydroxide—34 g
5. Dibromomethane—20 g
6. Cetyl bromide—70 g The $C_{16}$ end-capped comb copolymer thus obtained had a weight average molecular weight of 49,844 and the polydispersity index was 1.92. It was soluble in water (2% solution Brookfield viscosity at 30 rpm ~600 cps). The cetyl content of the copolymer was 1.52 wt %.

EXAMPLE 19

Preparation of $C_{16}$ end-capped comb polymer containing pendant $C_{16}$ hydrophobes Example 5 was repeated using 1-hexadecylamine in place of Rhodameen T-50.
1. PEG-8000—1000 g
2. 1-Hexadecylamine—8 g
3. Sodium hydroxide—34 g
4. Dibromomethane—20 g
5. Cetyl bromide—70 g The $C_{16}$ end-capped comb copolymer thus obtained had a weight average molecular weight of 45,842 and the polydispersity index was 1.74. It was soluble in water (2% solution Brookfield viscosity at 30 rpm ~520 cps). The cetyl content of the copolymer was 1.5 wt %. The nitrogen content of the copolymer was 29 ppm.

EXAMPLE 20

Preparation of $C_{16}$ end-capped comb copolymer bearing (dimethyl-n-propyl)silyl pendant groups Example 1 was repeated using a mixture of dibromomethane and (dichloromethyl) dimethyl-n-propylsilane in place of dibromomethane.
1. PEG-8000—100 g
2. Tetrahydrofuran—750 ml
3. Sodium hydride (60% dispersion in mineral oil)—4 g
4. (Dichloromethyl)dimethyl-n-propylsilane (Lancaster Synthesis Inc.)—0.5 g
5. Dibromomethane—2 g
6. Cetyl bromide—7 g The $C_{16}$ end-capped silylated comb copolymer thus obtained had a weight average molecular weight of 17,318 and the polydispersity index of 1.27. It was soluble in water (4% solution Brookfield viscosity at 30 rpm ~17 cps).

EXAMPLE 21

Preparation of $C_{16}$ end-capped comb copolymer containing pendant boronato-fluorophenyl hydrophobes Example 5 was repeated using 4-fluorobenzene boronic acid in place of Rhodameen T-50.
1. PEG-8000—1250 g
2. 4-Fluorobenzene boronic acid—3 g
3. Sodium hydroxide—34 g
4. Dibromomethane—20 g
5. Cetyl bromide—70 g The $C_{16}$ end-capped comb copolymer thus obtained had a weight average molecular weight of 31,007 and the polydispersity index was 1.6. It was soluble in water (1.7 wt % solution Brookfield viscosity at 30 rpm ~220 cps). The cetyl content of the copolymer was 1.97 wt %. The boron content of the copolymer was 164 ppm.

EXAMPLE 22

Preparation of $C_{16}$ end-capped comb copolymer containing pendant (dimethyl-n-propyl)silyl pendant hydrophobes Example 5 was repeated using a mixture of dibromomethane and (dichloromethyl) dimethyl-n-propylsilane in place of dibromomethane.

1. PEG-8000—1152 g
2. Sodium hydroxide—34 g
3. (Dichloromethyl) dimethyl-n-propylsilane—3.6 g
4. Dibromomethane—17 g
5. Cetyl bromide—70 g The $C_{16}$ end-capped comb copolymer thus obtained had a weight average molecular weight of 30,176 and the polydispersity index was 1.5. It was soluble in water (2 wt % solution Brookfield viscosity at 30 rpm ~230 cps). The cetyl content of the copolymer was 1.86 wt %.

EXAMPLE 23

Preparation of $C_{16}$ end-capped comb copolymer containing pendant fluorophenyl hydrophobes Example 5 was repeated using a mixture of dibromomethane and 3-fluorobenzal bromide in place of dibromomethane.

1. PEG-8000—1152 g
2. Sodium hydroxide—34 g
3. 3-Fluorobenzal bromide—5 g
4. Dibromomethane—17 g
5. Cetyl bromide—70 g The $C_{16}$ end-capped comb copolymer thus obtained had a weight average molecular weight of 31,492 and the polydispersity index was of 1.57. It was soluble in water (1.7 wt % solution Brookfield viscosity at 30 rpm ~330 cps). The cetyl content of the copolymer was 1.92 wt %.

I claim:

1. A comb copolymer comprising a backbone comprising (a) hydrophilic units, (b) at least one residue of a dihalogeno compound after the removal of halogen atoms and (c) at least one moiety containing pendant hydrophobe.

2. The copolymer of claim 1 wherein the hydrophilic units are derived from water-soluble polymers.

3. The copolymer of claim 1 wherein the hydrophilic units are derived from synthetic hydrophilic polymers selected from the group consisting of polyalkylene oxide, copolymer of polyalkylene oxide, poly(acrylic acid), poly(dialkyldiallylammonium salts), polyamidopolyamine, poly(ethyleneimine), poly(methyl vinyl ether-co-maleic anhydride), polyvinylpyrrolidone, poly(2-ethyloxazoline) and polypeptides.

4. The copolymer of claim 1 wherein the hydrophilic units are derived from compounds selected from the group consisting of water soluble polyalkylene oxides and copolymers thereof.

5. The copolymer of claim 1 wherein the residue of a dihalogeno compound is a hydrocarbyl radical.

6. The copolymer of claim 1 wherein the residue of a dihalogeno compound is derived from compounds selected from the group consisting of dihalogenoalkanes and their derivatives.

7. The copolymer of claim 1 wherein the residue of a dihalogeno compound is an organometallic radical.

8. The copolymer of claim 1 wherein the residue of a dihalogeno compound is an organosilyl radical.

9. The copolymer of claim 1 wherein the residue of a dihalogeno compound is an organophosphoryl radical.

10. The copolymer of claim 1 wherein the residue of a dihalogeno compound is derived from compounds selected from the group consisting of dihalogenoorganosilanes and their derivatives.

11. The copolymer of claim 1 wherein the residue of a dihalogeno compound is derived from compounds selected from group consisting of dihalogenoorgano-phosphorus compounds and their derivatives.

12. The copolymer of claim 1 wherein the moiety containing pendant hydrophobes is derived from compounds selected from the group consisting of hydrophobic compounds having alpha, omega-active hydrogen atoms and their alkoxylated derivatives.

13. The copolymer of claim 1 wherein the moiety containing pendant hydrophobes is derived from compounds selected from the group consisting of hydrophobic compounds having alpha, omega-active hydrogen atoms and their ethoxylated derivatives.

14. The copolymer of claim 1 wherein the moiety containing pendant hydrophobes is derived from hydrophobic compounds having alpha, omega-halogen atoms.

15. The copolymer of claim 4 wherein the polyalkylene oxides and copolymers of polyalkylene oxides have a weight average molecular weight of at least about 200.

16. The copolymer of claim 4 wherein the polyalkylene oxides and copolymers of polyalkylene oxides have a weight average molecular weight of up to about 35,000.

17. The copolymer of claim 12 wherein the hydrophobes of the hydrophobic compounds have a molecular weight of at least about 15.

18. The copolymer of claim 12 wherein the hydrophobes of the hydrophobic compounds have a molecular weight of up to about 1,100.

19. The copolymer of claim 1 wherein the geometry of the comb copolymer backbone is linear, branched or star type.

20. The copolymer of claim 1 wherein the hydrophobe is selected from the group consisting of hydrocarbyl, alkyl, aryl, arylalkyl, cycloaliphatic, perfluoroalkyl, carbosilyl, fullerenyl, polycyclic and complex dendritic groups.

21. The copolymer of claim 1 wherein the hydrophobe has at least one carbon atom.

22. The copolymer of claim 1 wherein the hydrophobe has up to forty carbon atoms.

23. The copolymer of claim 1 having a weight average molecular weight of at least about 6,000.

24. The copolymer of claim 1 having a weight average molecular weight of up to about 150,000.

25. The copolymer of claim 1 wherein the hydrophilic units are derived from water swellable polymers.

26. The copolymer of claim 1 wherein the moiety containing pendant hydrophobes is derived from hydrophobic compounds having alpha, omega-epoxy groups.

27. The copolymer of claim 1 wherein the moiety containing pendant hydrophobes is derived from fullerene compounds.

28. The copolymer of claim 4 wherein the residue of a dihalogeno compound is derived from compounds selected from the group consisting of dihalogenoalkanes and their derivatives, the moiety containing pendant hydrophobes is derived from compounds selected from the group consisting of hydrophobic compounds having alpha, omega-active hydrogen atoms and their ethoxylated derivatives, the polyalkylene oxides and copolymers of polyalkylene oxides have a molecular weight of from about 200 to about 35,000, the hydrophobes of the hydrophobic compounds have a molecular weight of from about 15 to about 1,100, the geometry of the comb copolymer backbone is linear, branched or star type, the hydrophobe is selected from the group consisting of hydrocarbyl, alkyl, alkenyl, aryl, arylalkyl, arylalkenyl, cycloaliphatic, perfluoroalkyl, carbosilyl, fullerenyl, polycyclic and complex dendritic groups, the hydrophobe has from one to ninety carbon atoms, and the comb copolymer has a weight average molecular weight of from about 6,000 to about 150,000.

29. The copolymer of claim 28 wherein the polyalkylene oxide units are derived from polyethylene oxide and water soluble copolymers of polyethylene oxide.

30. The polymer of claim 28 wherein the residue of dihalogeno compound is derived from gem-dihalogenomethane and its derivatives.

31. The copolymer of claim 28 wherein the moiety containing hydrophobes is derived from alkylene oxide modified fatty amines, and ethoxylated organosilicon or organophosphorous compounds having hydrophobes attached thereto.

32. The copolymer of claim 28 wherein the polyethylene oxide and copolymers of polyethylene oxide have a molecular weight of at least about 8,000.

33. The copolymer of claim 28 wherein the polyethylene oxide and copolymers of polyethylene oxide have a molecular weight of up to about 10,000.

34. The copolymer of claim 28 wherein the hydrophobes of the hydrophobic compounds have a molecular weight of at least about 115.

35. The copolymer of claim 28 wherein the hydrophobes of the hydrophobic compounds have a molecular weight of up to about 250.

36. The copolymer of claim 28 wherein the geometry of the comb copolymer backbone is linear.

37. The copolymer of claim 28 wherein the hydrophobe group is alkyl group.

38. The copolymer of claim 28 having a weight average molecular weight of at least about 15,000.

39. The copolymer of claim 28 having a weight average molecular weight of up to about 100,000.

40. The copolymer of claim 28 wherein the hydrophobe has at least six carbon atoms.

41. The copolymer of claim 28 wherein the hydrophobe has up to twenty-two carbon atoms.

42. The copolymer of claim 1 wherein the backbone is end-capped with hydrophobes.

43. The copolymer of claim 42 wherein the end-capping hydrophobes are selected from the group consisting hydrocarbyl, alkyl, alkenyl, aryl, arylalkyl, arylalkenyl, cycloaliphatic, perfluoroalkyl, carbosilyl, fullerenyl, polycyclic and complex dendritic groups.

44. The copolymer of claim 28 wherein the residue of dihalogeno compound is a hydrocarbyl radical having from 1 to 20 carbon atoms.

45. The copolymer of claim 29 wherein the residue of a dihalogeno compound is derived from gem-dihalogenomethane and its derivatives, the moiety containing hydrophobes is derived from alkylene oxide modified fatty amines, and ethoxylated organosilicon or organophosphorous compounds having hydrophobes attached thereto, the polyethylene oxide and copolymers of polyethylene oxide have a molecular weight of from about 8,000 to about 10,000, the hydrophobes of the hydrophobic compounds have a molecular weight of from about 115 to about 250, the geometry of the comb copolymer backbone is linear, the hydrophobe is alkyl group, the comb copolymer has a weight average molecular weight of from about 15,000 to about 100,000 and the hydrophobe has from six to twenty-two carbon atoms.

46. The copolymer of claim 45 wherein the hydrophobic moiety is derived from a fatty amine.

47. The copolymer of claim 45 wherein the hydrophobic moiety is derived from alkoxylated fatty amine.

48. The copolymer of claim 45 wherein the hydrophobic moiety is derived from ethoxylated fatty amine.

49. The copolymer of claim 45 wherein the residue of a dihalogeno compound is derived from the group consisting of dibromomethane, dichloromethane and their derivatives.

50. The copolymer of claim 47 wherein the residue of a dihalogeno compound is derived from the group consisting of dibromomethane, dichloromethane and their derivatives.

51. The copolymer of claim 28 wherein the backbone is end-capped with hydrophobes.

52. The copolymer of claim 28 wherein the hydrophobe is alkyl group.

53. The copolymer of claim 45 wherein the backbone is end capped with hydrophobes.

54. A process for preparing a comb copolymer comprising a backbone comprising (a) hydrophilic units, (b) at least one residue of a dihalogeno compound after the removal of halogen atoms and (c) at least one moiety containing pendant hydrophobe comprising copolymerizing:

(1) water soluble polymer bearing alpha, omega-active hydrogen atoms selected from the group consisting of polyalkylene oxides and copolymers of polyalkylene oxides, poly(acrylic acid), poly(acrylic acid-co-methacrylic acid), poly(acrylamide), poly(dialkyldiallylammonium salts), polyamidopolyamine, poly(ethyleneimine), poly(methyl vinyl ether-co-maleic anhydride), polyvinylpyrrolidone, poly(2-ethyloxazoline) and polypeptides (2) hydrophobic compounds having alpha, omega-active hydrogen atoms or their ethoxylated derivatives, or having alpha, omega-halogen atoms or alpha, omega-epoxy groups, and (3) dihalogeno compounds selected from the group consisting of dihalogenoalkanes and their derivatives, dihalogeno substituted aromatic compounds and their derivatives, and dihalogenoorganometallic compounds and their derivatives in the presence of a base for a sufficient time to form said comb copolymer.

55. The process of claim 54 wherein the water soluble polymer is selected from the group consisting of polyalkylene oxides and copolymers thereof.

56. The process of claim 54 wherein the polyalkylene oxides and copolymers of polyalkylene oxides have a weight average molecular weight of at least about 200.

57. The process of claim 54 wherein the polyalkylene oxides and copolymers of polyalkylene oxides have a weight average molecular weight of up to about 35,000.

58. The process of claim 54 wherein the dihalogenoalkanes or their derivatives are selected from the group consisting of gem-dihalogenomethane and its derivatives, the dihalogeno-substituted aromatic compounds and their derivatives are selected from the group consisting of dihalogenoxylenes and their derivatives and the dihalogenoorganometallic compounds or their derivatives are selected from the group consisting of dihalogenoorganosilanes, dihalogenoorganophosphorus compounds and their derivatives.

59. The process of claim 54 wherein hydrophobic compounds are selected from the group consisting of fatty amines, alkylene oxide modified fatty amines, alkoxylated organosilicon compounds and alkoxylated organophosphorus compounds having hydrophobes attached thereto.

60. The process of claim 54 wherein the hydrophobes of the hydrophobic compounds have a molecular weight of at least about 15.

61. The process of claim 54 wherein the hydrophobes of the hydrophobic compounds have a molecular weight of up to about 1,100.

62. The process of claim 54 wherein the hydrophobic compound has hydrophobe selected from the group consisting of hydrocarbyl, alkyl, alkenyl, aryl, arylalkyl, arylalkenyl cycloaliphatic, perfluoroalkyl, carbosilyl, fullerenyl, polycyclic and complex dendritic groups.

63. The process of claim 62 wherein the hydrophobe has at least one carbon atom.

64. The process of claim 62 wherein the hydrophobe has up to ninety carbon atoms.

65. The process of claim 54 wherein said comb copolymer has a weight average molecular weight of at least about 6,000.

66. The process of claim 54 wherein said comb copolymer has a weight average molecular of up to about 150,000.

67. The process of claim 62 wherein water soluble polymer is selected from the group consisting of polyalkylene oxides and copolymers thereof, the polyalkylene oxides and copolymers of polyalkylene oxides have a weight average molecular weight of from about 200 to about 35,000, the hydrophobic compounds have a molecular weight of from about 15 to about 1,100, the hydrophobe has from one to ninety carbon atoms, and said comb copolymer has a weight average molecular weight of from about 6,000 to about 150,000.

68. The process of claim 54 comprising reacting the comb copolymer with hydrophobic compound capable of reacting with active hydrogen atoms.

69. The process of claim 54 wherein the hydrophobic compound has hydrophobe selected from the group consisting of hydrocarbyl, alkyl, alkenyl, aryl, arylalkyl, arylalkenyl, cycloaliphatic, perfluoroalkyl, carbosilyl, fulierenyl, polycyclic and complex dendritic groups.

70. The process of claim 67 comprising reacting the comb copolymer with hydrophobic compound capable of reacting with active hydrogen atoms.

71. The process of claim 70 wherein the hydrophobic compound has hydrophobe selected from the group consisting of hydrocarbyl, alkyl, alkenyl, aryl, arylalkyl, arylalkenyl, cycloaliphatic, perfluoroalkyl, carbosilyl, fullerenyl, polycyclic and complex dendritic groups.

72. The process of claim 67 wherein the polyalkylene oxides and copolymers of polyalkylene oxides are selected from the group consisting of polyethylene oxide and water soluble copolymers of polyethylene oxide.

73. The process of claim 67 wherein the dihalogenoalkanes and their derivatives are selected from the group consisting of dibromo- and dichloromethane and their derivatives, the dihalogeno substituted aromatic compounds and their derivatives are selected from the group consisting of α,α'-dichloro- and α,α'-dibromoxylene and their derivatives and the dihalogenoorganometallic compounds and their derivatives are selected from the group consisting of gem-dichloro- and dibromo-organosilanes, gem-dichloro- and dibromo-organophosphorous compounds and their derivatives.

74. The process of claim 67 wherein the hydrophobic compounds having alpha, omega-active hydrogen atoms are selected from the group consisting of alkylene oxide modified fatty amines, and ethoxylated organosilicon or organophosphorus compounds having hydrophobes attached thereto.

75. The process of claim 72 wherein the polyethylene oxide and copolymers of polyethylene oxide have a molecular weight of at least about 8,000.

76. The process of claim 72 wherein the polyethylene oxide and copolymers of polyethylene oxide have a molecular weight of up to about 10,000.

77. The process of claim 72 wherein the hydrophobes of the hydrophobic compounds have a molecular weight of at least about 15.

78. The process of claim 67 wherein the hydrophobes of the hydrophobic compounds have a molecular weight of up to about 250.

79. The process of claim 67 wherein the hydrophobe is alkyl group.

80. The process of claim 67 wherein said comb copolymer has a weight average molecular weight of at least about 15,000.

81. The process of claim 67 wherein said comb copolymer has a weight average molecular weight of up to about 100,000.

82. The process of claim 67 wherein the hydrophobe has at least six carbon atoms.

83. The process of claim 67 wherein the hydrophobe has up to twenty-two carbon atoms.

84. The process of claim 72 wherein the dihalogenoalkanes and their derivatives are selected from the group consisting of dibromo- and dichloromethane and their derivatives, the dihalogeno substituted aromatic compounds and their derivatives are selected from the group consisting of α,α'-dichloro- and α,α'-dibromoxylene and their derivatives and the dihalogenoorganometallic compounds and their derivatives are selected from the group consisting of gem-dichloro- and dibromo-organosilanes, gem-dichloro- and dibromo-organophosphorous compounds and their derivatives, the hydrophobic compounds having alpha, omega-active hydrogen atoms are selected from the group consisting of alkylene oxide modified fatty amines, and ethoxylated organosilicon or organophosphorus compounds having hydrophobes attached thereto, the polyethylene oxide and copolymers of polyethylene oxide have a molecular weight of from about 8,000 to about 10,000, the hydrophobe groups of the hydrophobic compounds have a molecular weight of from about 115 to about 250, the hydrophobe is alkyl group, said comb copolymer has a weight average molecular weight of from about 15,000 to about 100,000, and the hydrophobe has from six to twenty-two carbon atoms.

85. The process of claim 67 comprising reacting the comb copolymer with hydrophobic compound capable of reacting with active hydrogen atoms.

86. The process of claim 69 wherein the hydrophobic compound has hydrophobe which is alkyl group.

87. A film forming coating composition comprising the comb copolymer of claim 1.

88. A film forming coating composition comprising the comb copolymer of claim 3.

89. A film forming coating composition comprising the comb copolymer of claim 4.

90. A film forming coating composition comprising the comb copolymer of claim 16.

91. A film forming coating composition comprising the comb copolymer of claim 28.

92. A film forming coating composition comprising the end capped comb copolymer of claim 42.

93. A film forming coating composition comprising the end capped comb copolymer of claim 43.

94. The film forming coating composition of claim 87 wherein the composition is a latex paint.

95. The film forming coating composition of claim 89 wherein the composition is a latex paint.

96. The film forming coating composition of claim 90 wherein the composition is a latex paint.

97. The film forming coating composition of claim 93 wherein the composition is a latex paint.

98. The copolymer of claim 1 wherein the residue of a dihalogeno compound is derived from compounds selected from the group consisting of dihalogeno substituted aromatic compounds and their derivatives.

99. The copolymer of claim 28 wherein the residue of dihalogeno compound is derived from compounds selected from the group consisting of dihalogeno substituted aromatic compounds and their derivatives.

100. The copolymer of claim 28 wherein the residue of a dihalogeno compound is derived from compounds selected from the group consisting of dihalogeno organometallic compounds and their derivatives.

101. The copolymer of claim 28 wherein the residue of a dihalogeno compound is derived from compounds selected from the group consisting of dihalogenoxylenes and their derivatives.

102. The copolymer of claim 45 wherein the residue of a dihalogeno compound is derived from compounds selected from the group consisting of dihalogenoxylenes and their derivatives.

103. The copolymer of claim 45 wherein the residue of a dihalogeno compound is derived from compounds selected from the group consisting of dihalogenoorganosilanes, dihalogenoorganophosphorous compounds, and their derivatives.

104. The copolymer of claim 45 wherein the residue of a dihalogeno compound is derived from compounds selected from the group consisting of dibromo- and dichloromethane and their derivatives.

105. The copolymer of claim 45 wherein the residue of a dihalogeno compound is derived from compounds selected from the group consisting of $\alpha,\alpha'$-dichloro- and $\alpha,\alpha'$-dibromoxylene and their derivatives.

* * * * *